US006931829B2

(12) United States Patent
Zehavi et al.

(10) Patent No.: US 6,931,829 B2
(45) Date of Patent: Aug. 23, 2005

(54) FRUIT HARVESTER COLLECTION APPARATUS WITH COMPACT CONVEYOR ARRANGEMENT AND ASSOCIATED METHODS

(75) Inventors: Eitan Zehavi, Kiriat Tivon (IL); David Chiel, Afula Ilit (IL); Michael L. Suter, Lakeland, FL (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/317,833

(22) Filed: Dec. 12, 2002

(65) Prior Publication Data

US 2004/0112032 A1 Jun. 17, 2004

(Under 37 CFR 1.47)

(51) Int. Cl.⁷ .............................................. A01D 46/00
(52) U.S. Cl. ..................................................... 56/340.1
(58) Field of Search ......................... 198/867.11, 803.12, 198/803.13, 803.16; 36/340.1, 340, 328.1, 329, 334, 336, 327.1; 460/144

(56) References Cited

U.S. PATENT DOCUMENTS

| 1,459,731 A | | 6/1923 | Henderson |
| 2,562,539 A | | 7/1951 | Ellis et al. |
| 3,473,613 A | * | 10/1969 | Boyce .......................... 171/14 |
| 3,548,579 A | * | 12/1970 | Shipley, Jr. ................... 56/329 |

(Continued)

FOREIGN PATENT DOCUMENTS

| WO | 01/35721 | 5/2001 |
| WO | 02/069693 | 9/2002 |
| WO | 02/089556 | 11/2002 |

OTHER PUBLICATIONS

Galen K. Brown: "Citrus Harvesting Program Update for the 1999–2000 season", Florida Depeartment of Citrus, published by Postharvest Florida Citrus Information Guide, pp. 1–16. date Oct. 2001.

Orchard Rite Ltd., "Nutshakers Agricultural Tree Shakers", Pacific Distributing, Inc., California, 1998.

Photograph labeled 1 is a photo of a Lilliston conveyor, no date.

Photograph labeled 2 is a photo of an Israeli agricultural machine, no date.

ASV, Inc., Grand Rapids, MN: "4810 Posi–Track All–Purpose Crawler", pp. 2–7, date 2000.

*Primary Examiner*—Árpád Fábián Kovács
(74) *Attorney, Agent, or Firm*—Allen, Dyer, Doppelt, Milbrath & Gilchrist, P.A.

(57) ABSTRACT

A fruit collection apparatus is for collecting fruit as the fruit is shaken from a tree, and may include a vehicle, and a fruit collector carried by the vehicle. The fruit collector may include a collection conveyor with opposing first and second ends and an exterior conveyor surface extending therebetween for collecting fruit as the fruit is harvested from the tree and advancing the fruit to the second end of this conveyor. The fruit collector may also include an intermediate conveyor having opposing first and second ends and an exterior conveyor surface extending therebetween for receiving fruit from the second or upper end of the collection conveyor. The fruit is advanced to the second end of the second conveyor. In addition, the fruit collector may also include a lifting conveyor which may have lower and upper ends and an interior conveyor surface extending therebetween. This lifting conveyor uses its interior conveyor surface for picking up fruit from the second end of the intermediate conveyor and lifting the fruit upward to the upper end of the lifting conveyor, such as for discharge into a fruit container.

28 Claims, 7 Drawing Sheets

U.S. PATENT DOCUMENTS

| | | | |
|---|---|---|---|
| 3,579,970 A | 5/1971 | Gilbert et al. | 56/328 |
| 3,623,308 A | 11/1971 | Nye | |
| 3,771,301 A | 11/1973 | Favor | 56/328 |
| 3,785,131 A | 1/1974 | Friday et al. | 56/328 |
| 3,808,786 A | 5/1974 | Beckens | 56/329 |
| 3,896,612 A * | 7/1975 | McHugh et al. | 56/329 |
| 3,901,005 A | 8/1975 | Rohrbach et al. | 56/330 |
| 3,961,718 A | 6/1976 | Lucas | 214/520 |
| 3,964,244 A | 6/1976 | Vallicella | 56/329 |
| 4,194,347 A | 3/1980 | Peters | 56/328 |
| 4,223,515 A | 9/1980 | Borchard | 56/328 |
| 4,275,548 A | 6/1981 | Savage, Sr. | 56/328 |
| 4,335,570 A * | 6/1982 | Fitzmaurice | 56/327.1 |
| 4,414,795 A | 11/1983 | Johnstone et al. | 56/328 |
| 4,768,332 A | 9/1988 | Bizzini | 56/340.1 |
| 4,986,065 A | 1/1991 | Compton | 56/340.1 |
| 5,228,279 A | 7/1993 | McKenna, Jr. et al. | 56/328.1 |
| 5,406,780 A | 4/1995 | Laserson et al. | 56/340.1 |
| 5,413,453 A | 5/1995 | Hill | 414/729 |
| 5,469,695 A | 11/1995 | Zehavi et al. | 56/301.1 |
| 5,473,875 A | 12/1995 | Zehavi et al. | 56/301.1 |
| 5,513,484 A | 5/1996 | Zehavi et al. | 56/16.6 |
| 5,563,097 A | 10/1996 | Lee | 56/340.1 |
| 5,784,871 A | 7/1998 | Glancey et al. | 56/327.1 |
| 5,816,037 A | 10/1998 | Chiel et al. | 56/301.1 |
| 5,860,273 A | 1/1999 | Laserson et al. | 56/301.1 |
| 5,860,859 A * | 1/1999 | Meester | 460/144 |
| 6,257,978 B1 * | 7/2001 | Meester | 460/145 |
| 6,282,878 B1 | 9/2001 | Hill | 56/329 |
| 6,378,282 B1 * | 4/2002 | Carlton | 56/330 |
| 6,442,920 B1 * | 9/2002 | Peterson et al. | 56/328.1 |

* cited by examiner

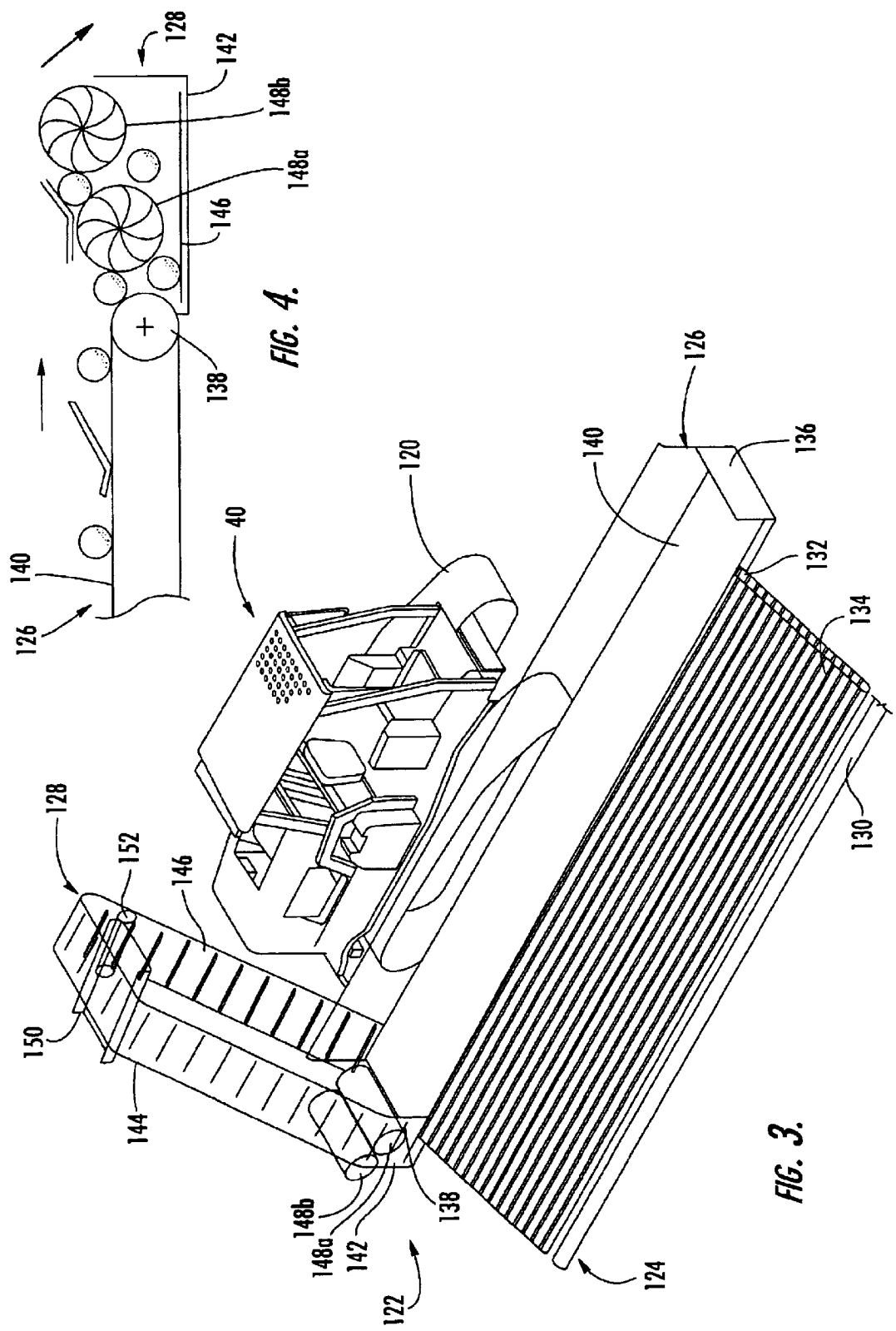

FRUIT HARVESTER COLLECTION APPARATUS WITH COMPACT CONVEYOR ARRANGEMENT AND ASSOCIATED METHODS

FIELD OF THE INVENTION

The invention relates to fruit harvesting equipment, and, more particularly, to a fruit collection apparatus for collecting fruit shaken from a tree and associated methods.

BACKGROUND OF THE INVENTION

Citrus fruit, such as oranges, for example, is commonly harvested from citrus groves using manual picking and collection techniques. Of course, more automated approaches have also been developed in an attempt to lower harvesting costs. For example, U.S. Pat. Nos. 5,469,695 and 5,513,484; and published international patent applications WO02/089556 and WO02/069693, to Zehavi et al., disclose a harvesting system based upon so called shake and catch technology. A shaker vehicle carries a shaker head to engage and vibrate a tree trunk to dislodge the fruit therefrom. The shaker head is carried by an extensible boom which can retract and extend the shaker head. In the extended position, the jaws of the shaker head engage the tree trunk and a hydraulically driven vibrator shakes the tree trunk. The shaker head can be retracted by the extensible boom for advancing to the next tree.

A fruit deflector is carried by the shaker vehicle and collects a portion of the fruit. A fruit collector vehicle is positioned along an opposite side of the tree. The fruit collector typically includes one or more fruit conveyors to catch the portion of the fruit falling thereon, as well as to receive fruit from the fruit deflector of the shaker vehicle.

The collected fruit is conveyed by the fruit collector vehicle to be temporarily held in a fruit trailer typically towed behind the fruit collector vehicle. The shaker vehicle and fruit collector vehicle are each advanced to a next tree for harvesting. Once filled, the fruit trailer is movable to a raised height and a door opened to thereby empty its contents into a fruit removal vehicle. The fruit removal vehicle is intermittently brought adjacent the fruit trailer to receive the fruit therefrom and transport the fruit to a collection area.

Of significant interest in the automated harvesting technology are efficiency of fruit collection, speed of collection, and, of course, cost and reliability of the various pieces of harvesting and collection equipment. Efficiency of fruit collection relates not only to the percentage of fruit shaken from the tree and collected, but also to how much fruit may be lost by damage in subsequent handling.

It is also typically important that the fruit collector efficiently collect fruit for discharge into the fruit trailer. A typical fruit collector, such as disclosed in U.S. Pat. No. 5,513,484 to Zehavi et al., includes an inclined collection conveyor and an intermediate conveyor adjacent the upper end of the inclined conveyor for conveying fruit to the rear of the vehicle. At this location, another conventional inclined conveyor extends outwardly from the back end of the vehicle. The back conveyor has a lower end and an upper end and an exterior conveyor surface extending therebetween. The collection efficiency of such an arrangement may be relatively good. Unfortunately, this arrangement of conveyors results in a relatively long apparatus that may be difficult to maneuver in the tight confines of a typical citrus grove, for example. It is also typically a challenge to process a large quantity of fruit and while preventing the accumulation of debris which could reduce harvesting efficiency.

SUMMARY OF THE INVENTION

In view of the foregoing background, it is therefore an object of the invention to provide a collection apparatus for collecting fruit as it is harvested from a tree, and wherein the collection apparatus is relatively compact, yet efficiently collects fruit, and is readily movable within the fruit grove.

This and other objects, features and advantages in accordance with the present invention are provided by a fruit collection apparatus for collecting fruit as the fruit is shaken from a tree, and comprising a vehicle, and a fruit collector carried by the vehicle. The fruit collector may include a collection conveyor having opposing first and second ends and an exterior conveyor surface extending therebetween for collecting fruit as the fruit from the tree and advancing the fruit to the second end of this collection conveyor. The exterior conveyor surface of the collection conveyor is preferably inclined so that the first end defines a lower end and the second end defines an upper end. In other words, the fruit is first collected and then dumped from the upper end of this first or collection conveyor.

The fruit collector may also include an intermediate conveyor having opposing first and second ends and an exterior conveyor surface extending therebetween for receiving fruit from the second or upper end of the collection conveyor. The fruit is advanced to the second end of the intermediate conveyor.

The fruit collector may also include a lifting conveyor which may have lower and upper ends and an interior conveyor surface extending therebetween. This lifting conveyor may use its interior conveyor surface for picking up fruit from the second end of the intermediate conveyor, for example, and lifting the fruit upward toward the upper end of the lifting conveyor. The lifting conveyor provides, in combination with the collection and/or intermediate conveyors, a very compact, yet efficient arrangement of conveyors to collect the fruit.

The fruit collector may be positioned so that the collection conveyor extends outwardly adjacent a side of the vehicle. In addition, the intermediate conveyor may extend in a horizontal direction parallel to the side of the vehicle, and between the vehicle and the collection conveyor. For a compact arrangement, the lifting conveyor may be positioned adjacent an end of the vehicle.

The lower end of the lifting conveyor may surround the second end of the intermediate conveyor. The fruit collector may also include at least one trash removal brush for directing fruit downward from the second end of the intermediate conveyor onto the lower end of the lifting conveyor while directing trash outwardly therefrom. For example, the at least one trash removal brush may comprise a pair of rotating trash removal brushes.

The fruit collector may further comprise a discharge chute within the upper end of the lifting conveyor. Accordingly, at least one guide roll may be provided adjacent the upper end of the lifting conveyor for directing fruit from the interior conveyor surface into the discharge chute.

The fruit collection apparatus may also include a fruit container movable with the vehicle for receiving fruit from the fruit collector. In addition, the conveyors may each comprise a hydraulically driven conveyor driven by a hydraulic power unit of the vehicle. The vehicle, in turn, may also include a chassis, an engine carried by the chassis, and a pair of opposing tracks carried by the chassis and driven by the engine. The tracks provide good maneuverability within a grove, for example.

A method aspect of the invention is for collecting fruit as the fruit is harvested from a tree. The method may include positioning a fruit collector carried by a vehicle adjacent a tree to be harvested, the fruit collector comprising a collection conveyor having opposing first and second ends and an exterior conveyor surface extending therebetween, and a lifting conveyor downstream from the collection conveyor and having lower and upper ends and an interior conveyor surface extending therebetween. The method may also include operating the collection and lifting conveyors to harvest the fruit. In some embodiments, the fruit collector may also include an intermediate conveyor having opposing first and second ends and an exterior conveyor surface extending therebetween. Accordingly, the method may also include receiving fruit from the second end of the collection conveyor onto the intermediate conveyor and advancing fruit to the lower end of the lifting conveyor.

BRIEF DESCRIPTION OF THE DRAWINGS

FIG. 3 is a perspective view of the fruit collector apparatus of the harvester system as shown in FIG. 1.

FIG. 4 is a schematic side elevational view of a portion of the fruit collection apparatus as shown in FIG. 3 illustrating separation and removal of debris from the fruit.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
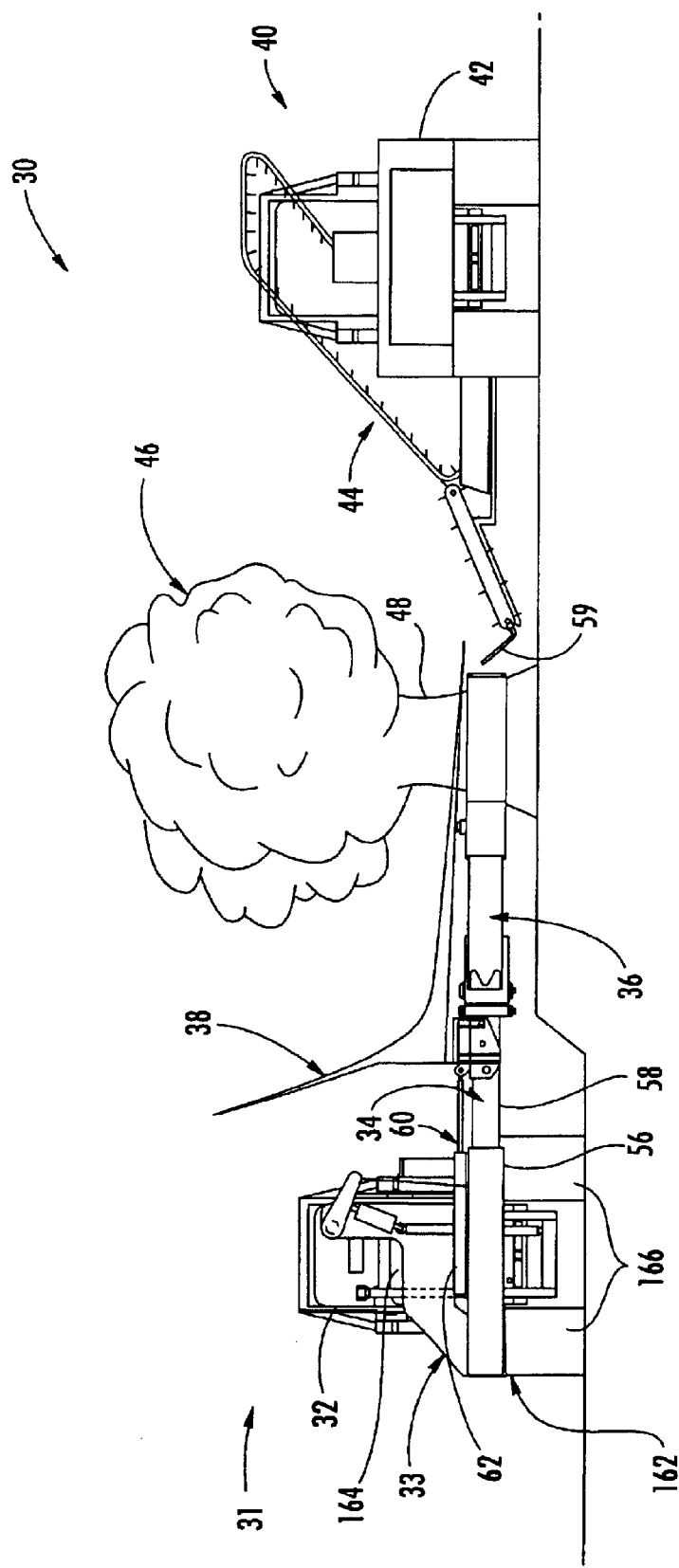
FIG. 1 is a schematic front elevation view of the harvester system in accordance with the present invention.

Referring initially to FIG. 1, a fruit harvesting system 30 according to the invention is described. The fruit harvesting system 30 illustratively comprises a fruit harvester 31, which, in turn, comprises a shaker vehicle 32, a boom assembly 33 carried by the shaker vehicle, a shaker head 36 carried by the boom assembly, and a fruit deflector 38 carried by the boom assembly. The fruit harvester system 30 also comprises, as shown in the righthand portion of FIG. 1, a fruit collection apparatus 40. The fruit collection apparatus 40, in turn, comprises a collector vehicle 42 and a fruit collector 44 carried by the collector vehicle.

The fruit harvester 31 and the fruit collection apparatus 40 of the fruit harvesting system 30 operate cooperatively with one another in accordance with the principles of shake and catch technology as will be appreciated by those skilled in the art. With the shaker vehicle 32 positioned adjacent a particular tree 46, the boom assembly 33 carried by the vehicle readily and accurately positions the boom 34 and thus shaker head 36 with respect to the tree. So positioned, the shaker head 36 is operated to grasp and vibrate the trunk 48 of the tree 46. As the tree 46 vibrates, fruit falls from the tree and is deflected by the fruit deflector 38 so that the fruit collection apparatus 40 is able to collect the fruit. The fruit collection apparatus 40 includes a movable seal 59 that is positioned to prevent fruit from falling between the two collection surfaces as will be appreciated by those skilled in the art.

The boom 34 may be a telescoping boom that includes a proximal boom section 56 and a distal boom section 58. The distal boom section 58 slidably moves within the proximal boom section 56 to thereby increase and decrease the length of the boom 34 accordingly, as will be readily understood by those skilled in the art. The boom assembly 33 further includes a boom extension/retraction actuator 60 connected between the proximal and distal boom sections 56, 58. The extension/retraction actuator 60 illustratively comprises a hydraulic cylinder 62 and can be selectively operated from a hydraulic power unit (not shown) of the vehicle 32. As will be readily appreciated by those skilled in the art, however, various other arrangements are also contemplated by the present invention to extend and retract the telescoping boom 34.

The shaker head 36 is illustratively connected to the distal end 54 of the boom 34. The shaker head 36 may comprise a vibration unit and jaws connected thereto to grasp and hold a tree trunk while the vibration unit shakes the tree so that fruit is dislodged from the branches of the tree.

The shaker vehicle 32 illustratively comprises a chassis 162, an engine 164 carried by the chassis, and a pair of tracks 166 carried by the chassis and driven by the engine. The shaker vehicle 32 may be based upon an ASV 4810 Posi-Track all-purpose crawler, for example, although those of skill in the art will recognize that other similar vehicles may also be used. For better balance the track opposite the shaker head 36 may be extended outwardly from the vehicle chassis. In addition, or in the alternative, counterweights may also be carried by this opposite side of the vehicle 32.

Figure 2:
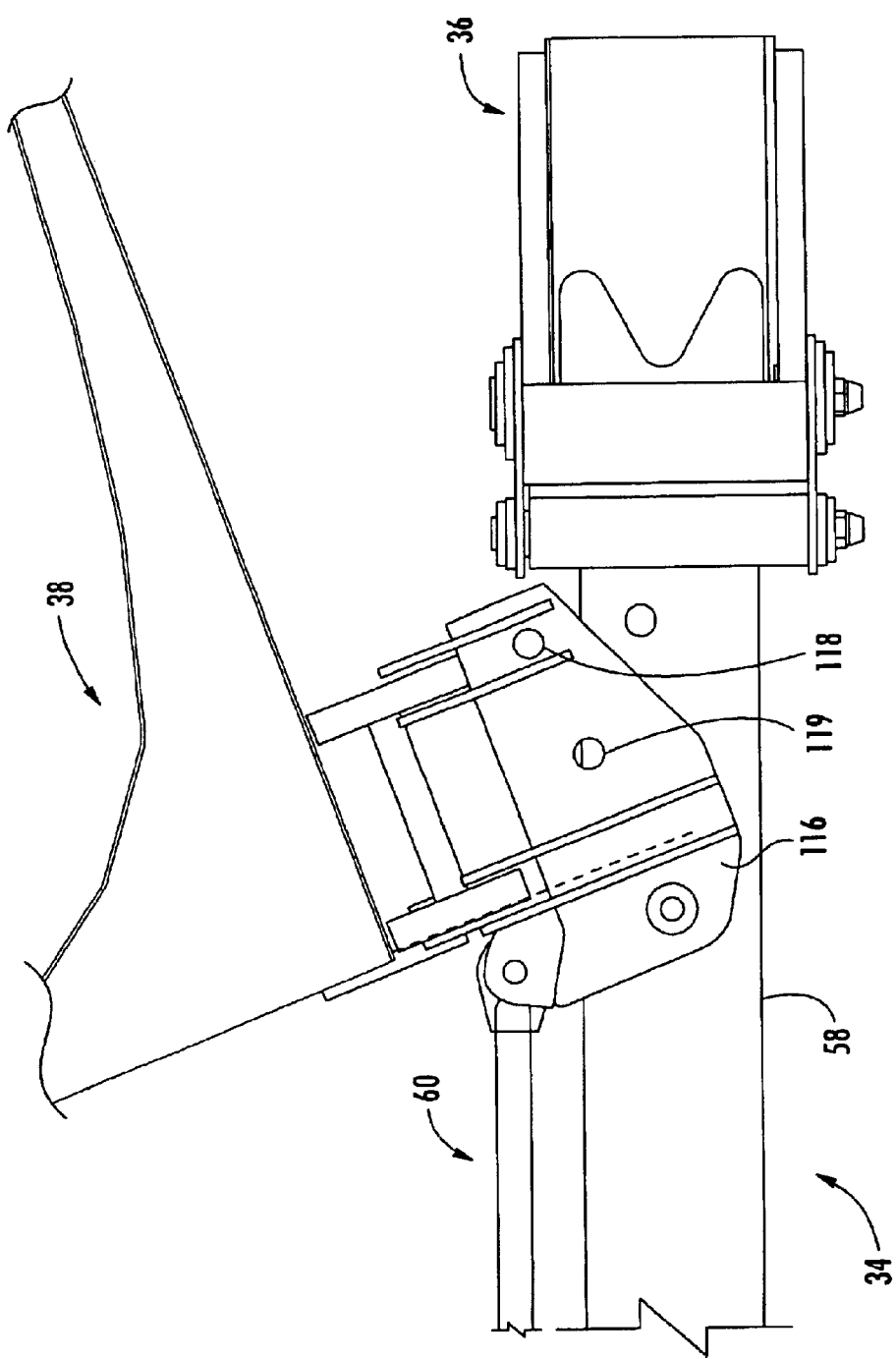
FIG. 2 is a side elevation view of a portion of the boom and fruit deflector of the harvester as shown in FIG. 1.

Referring now additionally to FIG. 2, the fruit deflector 38 is pivotally connected to the boom 34 so that the fruit deflector can be positioned either in an operating position or in a retracted position. In the operating position, the fruit deflector 38 is pivoted so that the lower portion of the fruit deflector is adjacent the shaker head 36. The fruit deflector 38, in the retracted position, is pivoted upward so that the lower portion extends upward and away from the shaker head. With the fruit deflector 38 in the retracted position, one may gain ready access to the shaker head 36 to thereby service or replace portions thereof.

More particularly, the fruit harvester 30 illustratively includes a fruit deflector mounting bracket 116 positioned on the distal section 58 of the boom 34 to pivotally connect the fruit deflector 38 to the boom. Additionally, the fruit harvester 30 comprises a locking mechanism that cooperates with the fruit deflector mounting bracket 116 and the boom 34. The locking mechanism serves to lock the fruit deflector 38 in at least one of the operating and retracted positions. The locking mechanism, more specifically, includes respective aligned passageways 118 extending into the boom 34 and the fruit deflector mounting bracket 116 along with a removable lock pin (not shown) to be received in the aligned passageways. With the locking pin removed, the boom extension/retraction actuator 60 may pivotally move the fruit deflector mounting bracket 116 thereby moving the fruit deflector 38.

A second passageway 119 in the mounting bracket may receive the locking pin when the retracted position to hold the fruit deflector 38 in the retracted position. Of course, other locking arrangements are also contemplated by the present invention as will be appreciated by those skilled in the art.

Figure 5:
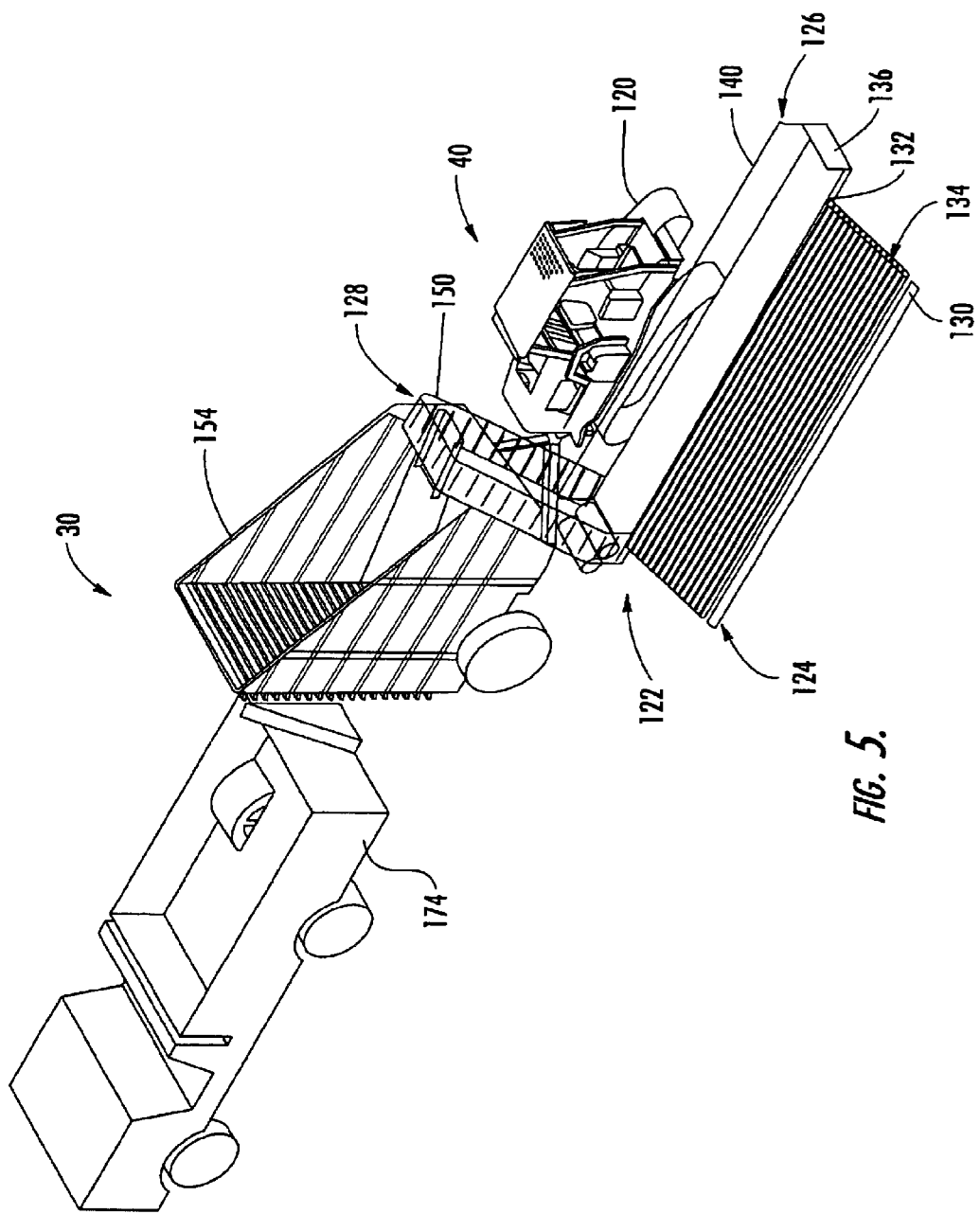
FIG. 5 is a perspective view of the fruit collector apparatus, fruit trailer, and fruit removal vehicle of the fruit harvester system as shown in FIG. 1.
Figure 6:
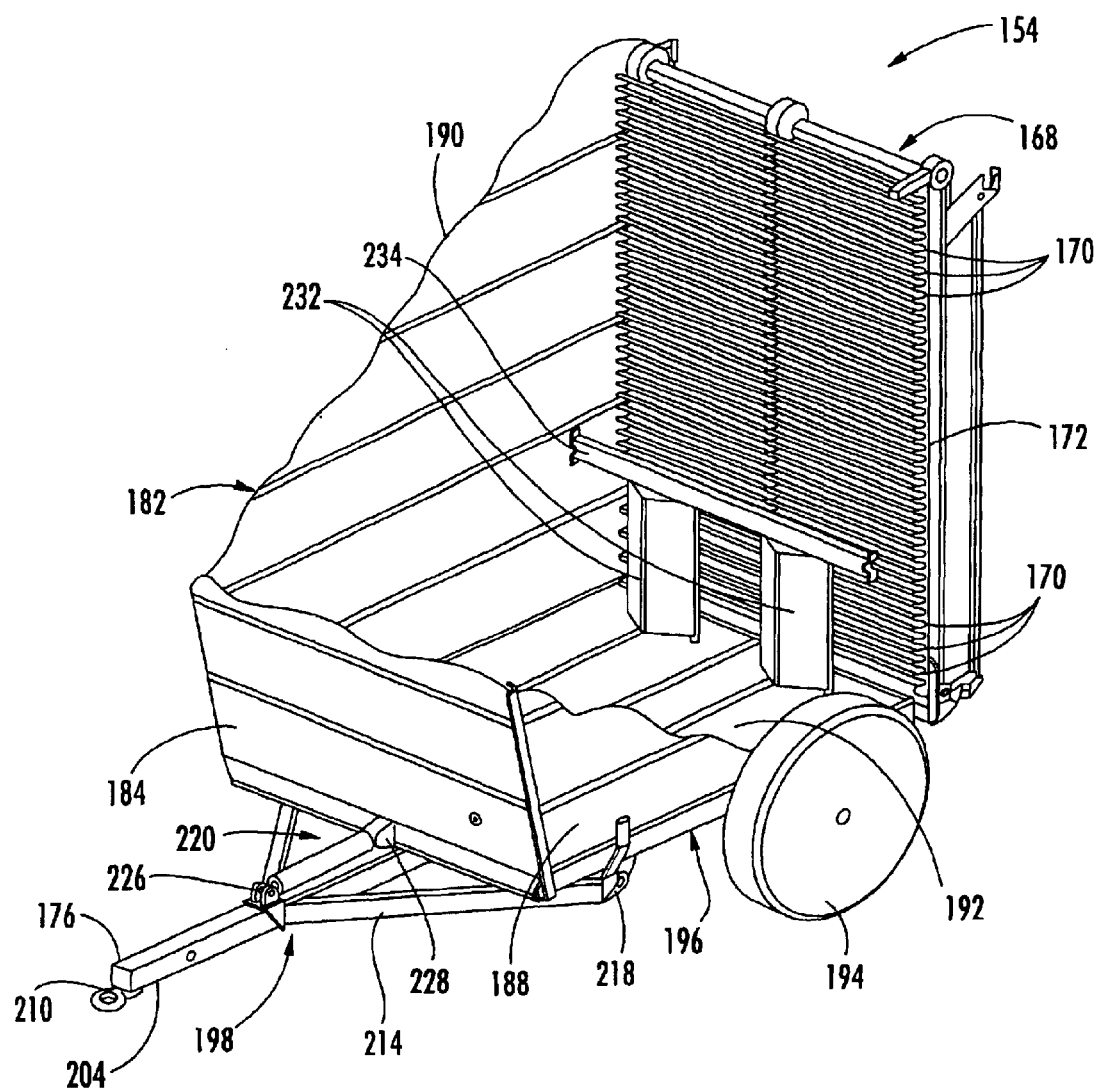
FIG. 6 is a fragmentary perspective view of the fruit trailer as shown in FIG. 11.
Figure 7:
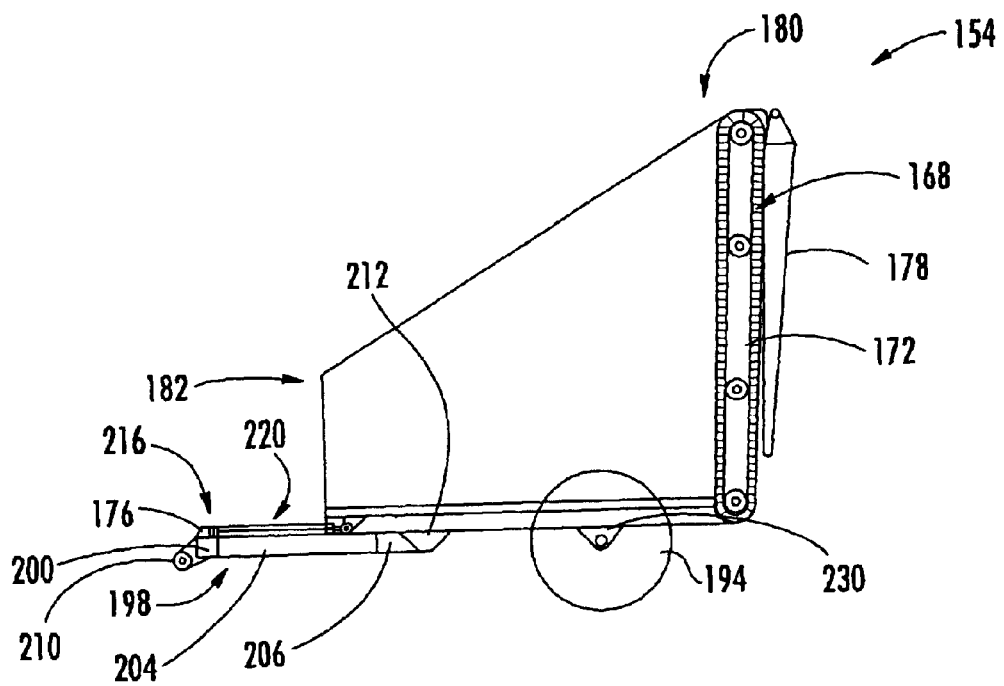
FIGS. 7–9 are side elevational views of the fruit trailer as shown in FIG. 6 during various phases of use.
Figure 8:
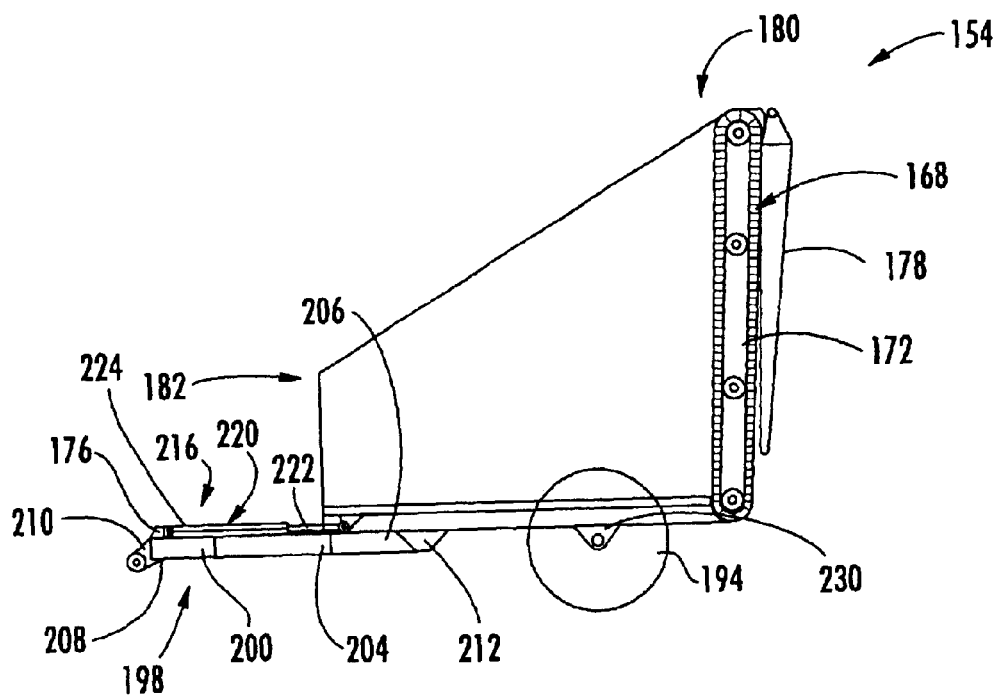

With reference now to FIGS. 3–5, the fruit collection apparatus 40 for collecting fruit comprises a collector vehicle 120 and a fruit collector 122 carried by the vehicle. The fruit collector 122 illustratively includes three cooperating conveyors, namely, a first conveyor 124, a second conveyor 126, and a third conveyor 128. The first conveyor 124 may also be considered and is also referred to herein as a collection conveyor. The second conveyor 126 may be considered an intermediate conveyor, and the third conveyor 126 may be considered a lifting conveyor.

The first conveyor 124 has opposing first 130 and second 132 ends as well as an exterior conveyor surface 134 extending therebetween. The first conveyor 124 collects fruit as the fruit is shaken from the tree. Specifically, the fruit deflector 38 deflects fruit to the first conveyor and the first conveyor directly collects a portion of the dislodged fruit. The exterior conveyor surface of the first conveyor 124 is inclined such that the first end is lower than the second end, the ends thus defining respectively lower and upper ends of the first conveyor. Fruit is conveyed by the exterior conveyor surface 134 to the second conveyor 126.

This first or collection conveyor 124 may also be connected to the vehicle 120 via an extensible actuator, not shown, to permit more accurate positioning. In addition, the collection conveyor 124 may also be angularly positionable in yet other embodiments with suitable positioners and mounting arrangements. Yet further, the entire fruit collector 122 may be pivotally connected at one end of the vehicle 120 and releasably connected at the other end to permit the fruit collector to be swung away from the vehicle, such as to permit track maintenance, for example.

The second conveyor 126 of the fruit collector 122 has opposing first and second ends 136, 138 and an exterior conveyor surface 140 extending therebetween for receiving fruit from the first conveyor. The fruit is advanced to the second end 138 of the second conveyor 126.

The third conveyor 128 has lower and upper ends 142, 144 and an interior conveyor surface 146 extending therebetween. Fruit is picked up from the second end 138 of the second conveyor 126 by the interior conveyor surface 146 of the third conveyor 128, which lifts the fruit upward to the upper end 144 of the third conveyor 128. Thus, the third conveyor 128 provides, in combination with the first and second conveyors 124, 126, a very compact, yet efficient arrangement of conveyors for collecting fruit after it has been shaken from a tree.

In other embodiments, the third or lifting conveyor 128 may be used directly with the first or collection conveyor 124 without the intermediate conveyor 126. In this embodiment, the lifting conveyor 128 is relatively large and extends along the full length of the first or collection conveyor 124 as will be appreciated by those skilled in the art.

The fruit collector 122 is illustratively positioned so that the first conveyor 124 extends outwardly from a side of the collector vehicle 120. In addition, the second conveyor 126 extends in a horizontal direction parallel to the same side of the collector vehicle 120 between the vehicle and the first conveyor 124. The third conveyor 128 is positioned adjacent an end of the collector vehicle 120, such as the back end, for example.

More particularly, the lower end 142 of the third conveyor 128 surrounds the second end 138 of the second conveyor 126. The fruit collector 122 also includes a pair of rotating trash removal brushes 148a, 148b adjacent the lower end 142 of the third conveyor 128 to direct fruit downward onto the lower end of the third conveyor while directing trash outwardly therefrom as perhaps best appreciated with reference to FIG. 11B. The brushes 148a, 148b may each rotate in the same direction. The fruit collector 122 also comprises a discharge chute 150 within the upper end 144 of the third conveyor 128. A guide roll or drum 152 is provided adjacent the upper end 144 of the third conveyor 128 for directing fruit from the interior conveyor surface 146 into the discharge chute 150. The third conveyor 128 may be formed as an open slat conveyor to thereby also permit trash to pass therethrough as will be appreciated by those skilled in the art.

The third or lifting conveyor 128 raises fruit from the intermediate conveyor 126 to the chute 150 that transfers the fruit to the trailer 154. Mounted tangentially to the second conveyor 126, the third conveyor 128 reduces the distance which would otherwise be required between the trailer 154 and the collector vehicle 120 while enabling the fruit to be raised sufficiently high to gravity discharge into the trailer. The third or lifting conveyor 128 is able to elevate the fruit at a much greater angle than other approaches and while significantly reducing the needed length.

The lifting conveyor 128 in some embodiments may include a positive drive turning two or more cogged belts with tangentially mounted cleats and flat bars, one drive, and three or more driven drums, not shown. The conveyor 128 may also include two side plates of sufficient size to be greater than the height to of the cleats. Unlike typical cleated belts, the lifting conveyor 128 may incorporate cleats with their upper extensions positioned toward the drive and/or driven shafts rather than away from the shafts, making the cleats on the inside portion of the belt. Mounted in parallel with the cleats, flat bars provide support for the fruit and contain the fruit within the conveyor 128. Equally and sufficiently spaced, the cleats and flat bars, allow denser unwanted material such as stones or immature fruit to fall free and clear of the conveyor as will be appreciated by those skilled in the art. In other words, this arrangement allows unwanted material to fall freely from the conveyor 128 without being trapped as would otherwise occur with conventional conveyors.

With a shaft smaller than the drive wheels mounted onto the shaft, the belt 146 is positioned sufficiently far enough away from the outer surface of the drum 152 to allow passage of the cleat over the drum with sufficient distance to clear, while not allowing fruit held within the cleat and flat bars to be smashed against the drum. Fruit is carried by forward motion of the belt and cleat around and over and around the drive drum 152 at which point gravity overcomes this motion and allows the fruit to drop onto the chute 150 positioned adjacent the drive drum 152 and under the belt 146 at a sufficient angle to discharge the fruit. Fruit contacting the discharge chute 150 is removed by both gravity and the inertia of the moving fruit. While the chute 150 in this embodiment is constructed to discharge the fruit in the same direction of movement as the fruit entering the lift conveyor 128, the arrangement is also capable of diverting fruit in the opposite direction.

Referring more specifically to FIG. 4, prior to entering the lifting conveyor 128, fruit from the second conveyor surface or belt 140 enters the combination of two or more brushes 148a, 148b as described above. Bristles on the brushes 148a, 148b allow denser material to fall between the brush shaft and the discharge of the discharge end 138 of the second conveyor 126. Limbs, leaves and other undesirable material either too light to penetrate the bristles or too long to drop between the first brush 148a and the discharge end 138 of the conveyor 126 are passed to an additional adjacent brush 148b. This brush 148b, also rotating in the direction of the fruit and unwanted material, enables fruit, which might have been carried over from the first brush 148a due to excessive feeding, to fall into the third conveyor lower end 142 beneath the brushes.

Designed to interact with the first brush 148a, the bristles of the second brush 148b are of sufficient strength to keep lighter material from falling between the first and second brushes thus keeping the unwanted material out of the third conveyor lower end 142 below and continuing in a direction that takes the unwanted material out of the conveying system. A third brush, not shown, may be used where the width of the third conveyor lower end 142 is such that two brushes 148a, 148b are not fully capable of preventing the waste from dropping back into the third conveyor. This brush is also added where the amount of fruit entering the third conveyor 128 is of such capacity as to carry over both the first and second brushes 148, thus increasing the area in which the fruit may be dropped into the lifting conveyor lower end 142.

After passing through the area of the brushes 148a, 148b, fruit is deposited onto the lower end 142 beneath the brushes moving tangentially to the flow of fruit entering the brush area. Traveling at a speed sufficient to remove the fruit prior to overloading this conveyor 128, the belt 146 is transferred from a horizontal plane to a vertical angle intended to raise the fruit in a vertical manner. Using a driven shaft whose drums are designed to maintain a distance sufficient to allow the fruit to pass around the shaft, the belt motion lifts the fruit using the cleats mounted to the belt as a support. When the slope of the belt is such that fruit may roll back, a panel is used to contain the fruit. The panel, typically belting material, can be supported by the side plates thus providing a gap sufficient to contain fruit, but not applying continuous pressure to the fruit as it is raised up the third conveyor 128.

Design of the side plates is such that the fruit is prevented from moving to the portion of the belt 146 which is in contact with the drums of both the drive and driven shafts. This enables the drums to make contact with the belt 146 in such a manner as to provide either rotary motion or spacing depending if the drum is mounted to the drive or driven shaft.

The drive shaft of the lifting or third conveyor 128 is powered typically by a hydraulic motor sized to provide sufficient torque and speed to move the fruit. The brushes 148a, 148b may either be driven independently, be driven by the lifting conveyor 128, or be driven by the second feeding conveyor 126 by either a chain and sprocket or other means of transferring motion between conveyors shafts. In some embodiments, the brushes 148a, 148b are linked by a chain so as to rotate at the same speed, and are driven by another chain and set of sprockets powered by the second conveyor's driven shaft.

Referring now additionally to FIGS. 6–9, the harvesting system 30 also includes a fruit trailer 154. The fruit trailer 154 is movable with the collector vehicle 120 and can be positioned at the end of the collector vehicle 120 adjacent the third conveyor 128 to receive fruit from the discharge chute 150 of the third conveyor. Having collected the fruit, the fruit collection trailer 154, as explained in greater detail below, periodically loads the fruit to a removal vehicle 174 that can carry the fruit to a harvest collection site. As also explained in greater detail below, the fruit collection trailer 154 is configured to collect a relatively large quantity of fruit. The fruit collection trailer 154 comprises an inclined conveyor 168 that loads the fruit into the removal vehicle without significant risk of bruising or damage to the skin of the fruit.

Were the harvested fruit to be loaded via conventional methods and devices, such as a bucket conveyor, the fruit could be easily damaged by the mechanical digging of the bucket into the heap of fruit. However, when use is made of an inclined conveyor 168, it is possible to take advantage of gravity to load the inclined conveyor, making the use of buckets superfluous. The inclined conveyor 168 comprises rims or ridges 170 on an endless belt 172, as will be readily understood by those skilled in the art. Thus, ridges 170 satisfactorily replace conventional buckets in the loading process.

Conveyors previously have not been practical for such use because they ordinarily require a large amount of space in which to operate. The fruit collection trailer 154, however, overcomes the problem by stowing the conveyor vertically when it is not in use. When the conveyer 168 is in use, it is inclined by tilting the fruit collection trailer 154, which in turn causes the fruit to move onto to the inclined conveyor to thereby unload fruit from the fruit collection trailer to a removal vehicle 174.

The fruit collection trailer 154 further comprises a fruit container 182 and a hitch 176 is provided on a front end for connection to the collector vehicle 120. A pivoting spout 178 is provided at the rear of the fruit container 182. The fruit container 182 is illustratively provided by a four-sided, bottomed box. The four side portions comprise a front wall 184, a back wall 186, and opposing side walls 188, 190 therebetween. The back wall 186 is about two and a half times as high as the opposite front wall 184 and the two opposite side walls 188, 190. The side walls 188, 190 have a trapezoidal shape with a lower side as low as and coupled to the front wall 184, and a higher side as high as and coupled to the back wall 186. Each, however, is substantially perpendicular to the bottom portion 192. The fruit container 182 is configured for minimal external dimensions and maximal internal fruit containment volume. Two wheels 194 are provided and restricted outside measurements prevent impediment of the trailer as it is maneuvered between rows of trees. In other embodiments, tracks may be substituted for the wheels 194 as will be appreciated by those skilled in the art.

The walls 184, 186, 188, 190 of the container 182 are straight and keep the added length of the harvester and of the trailer 154 within a practical length limit (e.g., 2.8 m), while providing enough containment for the collected fruit. As desired, one or more of the walls of the container 182 may be inclined relative to the bottom 192. Usually, the container 182 is filled with fruit to a level below or up to the height of the front wall 184. The width of the fruit collector trailer 154 may be, for example, about 1.8 m.

After collecting fruit, the fruit trailer 154 is tilted backwards from the direction in which it is towed, thus pivoting about the two wheels 194. The translation and tilting mechanisms are explained in detail below.

With the fruit collection trailer 154 tilted backwards, the fruit in the box 182 tends to establish a new fruit level. To prevent loss of collected fruit the back wall 186 is made higher than the opposite front wall 184. This is the reason why it is advantageous for the two opposite side walls 188, 190 to have a height ranging from the height of the front wall to the height of the back wall. The new fruit level, after tilting, now reaches to just below or up to the height of the back wall 186.

The whole width of the back wall 186 spanning between the two opposite sidewalls 188, 190, is configured as a trailer-conveyor. In the collection configuration, when the fruit is conveyed into the fruit collection trailer 154, the trailer, and, hence its conveyor 168, are in a vertical position with respect to the surface on which the trailer is positioned. When the fruit collection trailer 154 is in the tilted position, however, the now inclined bottom portion 192 of the box 182 automatically loads the inclined conveyor 168 of the fruit collection trailer 154 by gravity.

When the fruit collection trailer 154 and its conveyor 168 are in the tilted position, a removal vehicle 174, such as a flatbed truck, is positioned under the tilted fruit collection trailer 154 and its conveyor 168 to load fruit into the removal vehicle to be transported to a harvest collection site. When loading is completed, the tilted fruit collection trailer 154 is redressed to level position, with the difference that the box 182 of the fruit collection trailer is now empty.

Fruit collection beginning with the collection of fruit from the fruit harvester 31 through the loading of the removal vehicle 174 is cost-efficient for many reasons. For one thing, the fruit collection trailer 154 is highly maneuverable. For another, the volume of the fruit container 182 is large and does not impose frequent stops in the harvesting process for unloading. Moreover, the loading of a removal vehicle 174 such as a flatbed truck via a trailer-wide trailer having a conveyor is efficient so that the vehicle and the driver are not immobilized for long periods of time.

In symmetry about the width of the fruit container 182, but below the frame 196, a bi-directional, telescopic trailer boom 198 is retained to protrude ahead of the front wall 184 in parallel to the bottom 192 of the container.

The trailer boom 198 illustratively includes of two portions capable of relative longitudinally aligned translation. A first portion, extendable out and retractable into the boom 198, is a freely suspended portion 200, or piston, engaged with the second portion of the boom 204, which is the outer portion, or cylinder. The boom 198 may have a circular, rectangular, or any practical cross-section, as will be readily understood by one skilled in the art.

At the free end extremity 208 of the piston 200, a female hitch coupling 210 is fixedly retained to couple with a male hitch coupling. The cylinder back extremity 206 which is the closed end of the cylinder 204 is below the bottom 192 of the container 182, and is pivotally coupled to the bottom by a boom pivot 212, located about a fourth of the length of the fruit collection trailer 154 behind the front wall 184. The boom pivot 212 is restrained to motion in a vertical plane. The trailer boom 198 forms a bi-directional power jack that, as will be readily appreciated by those skilled in the art, can be driven hydraulically or powered by an alternate source. The power source may be situated in and controlled from the collector vehicle 42 as it drives the fruit trailer 154 within a fruit grove.

By command, the piston 200 may be extended out of the cylinder 204 to distance the fruit collection trailer 154 away from the fruit collector 44, which is used to load the fruit collection trailer 154 as both are driven by the collector vehicle 42. The distance can be about 30 to 40 cm, for example. This means that the distance between the fruit collector 44 and the front wall 184 of the fruit collection trailer 154 is augmented without disconnecting the hitch 210. Likewise, retraction of the piston 200 into the cylinder 204 returns the container 182 to the collection configuration.

By translational action of the trailer boom 198, the open top portion of the container 182 can be positioned, for example, beneath the discharge chute 150 to readily receive fruit therefrom and then in a reverse operation be cleared from beneath the discharge chute.

For the sake of lateral rigidity, the cylinder 204, which protrudes ahead of the front wall 184, is stiffened by two arms 214, with each arm being fixedly attached on each side of the cylinder 204 and in a plane parallel to the bottom 192. While retained at a first end to the cylinder 204, each arm 214 is pivotally coupled to pivot in the vertical plane at arm ears 218 (only one of which is shown) that are solidly affixed below the frame 196 along the respective sidewalls 188, 190. The trailer boom 198, pivotally coupled by the boom pivot 212, and in alignment with both arm ears 218 relative to the bottom 192, is thus capable of pivoting relative to the plane of that floor, when the container 182 is tilted.

Figure 9:
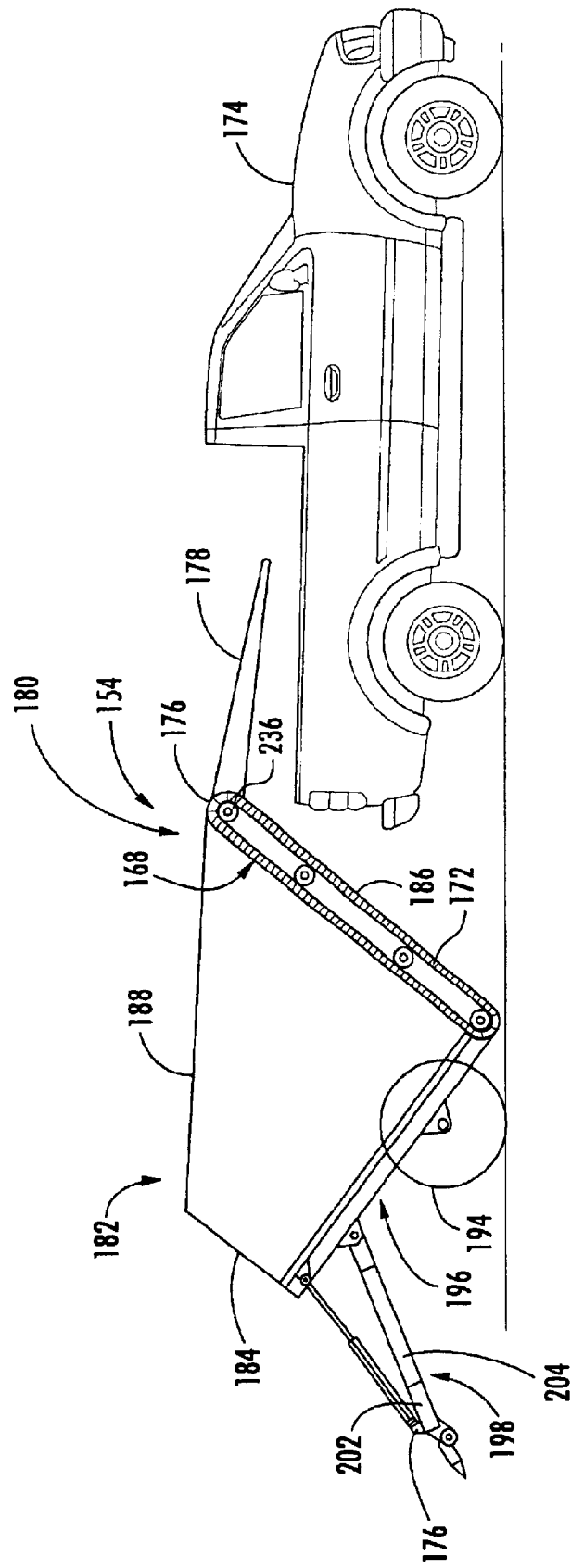

Another bi-directional power jack, defining an incline jack 220, is mounted in parallel with the cylinder 204, adjacent and above the cylinder. The incline jack 220 comprises a jack piston 222 and jack cylinder 224, the jack piston engaging the jack cylinder (shown in an extended position in FIG. 9) in relative longitudinally aligned translation. The incline jack 220 can be powered, for example, by an energy source (not shown) located on and controlled from the collection vehicle 42. The front end of the jack piston 222 is pivotally coupled to a pair of parallel front ears 226 fixedly retained just above the cylinder front extremity to pivot in the vertical plane. Likewise, the rear extremity of the jack cylinder 224 is pivotally coupled to jack ears 228 attached in the middle of the bottom portion of the front wall 184, for pivoting in the vertical plane (FIG. 9).

When extended, the incline jack 220 exerts a rearward moment about the wheel pivots 230 or axle, of both wheels 194, forcing the front wall 184 to lift while the back wall 186 descends. At the same time, as described above, the trailer boom 198 pivots relatively to the bottom 192 that slopes rearwards. The incline jack 220 is thus able to both tilt the fruit collection trailer 154 backwards and redress it to level condition. The angle of tilt is about 35° relative to the horizon. This means that the trailer conveyor 168 forming the back wall 186, passes from a vertical position in the collection configuration, to an inclination of 350 in the loading position, and so tilts the floor 192. Fruit collected inside the box 182, tends to level and, thus, when the fruit collection trailer 154 is tilted to the loading configuration, fruit descends along the floor 192 to the conveyor 168. The net result is that fruit is loaded by gravity onto the now inclined trailer conveyor 168.

The trailer conveyor 168, as noted above, comprises an endless conveyor belt 170 running about two rollers (not shown) that are located respectively at the bottom and at the top of the trailer conveyor. Power for motion of the conveyor belt can be provided by and controlled from the collection vehicle 42.

The conveyor belt 170 spans the inside width of the box 182 and, as also noted above, is provided with ribs 172, that are semi-rigid, flexible, and protruding in perpendicular to the surface of the conveyor belt. The conveyor belt 170 is thus able to prevent harm to the skin of the fruit by imparting an inclination for gently loading the fruit by gravity, as opposed to forced loading, such as with conveyor belts using solid ribs or buckets.

When the fruit collection trailer 154 is filled with fruit and resides in the titled loading configuration at an angle of 35°, the force exerted by the weight of the fruit on the trailer conveyor 168 equals the sine of the angle times the weight of the fruit load. As the sine of 35° equals 0.57, a weight of about 60% of the fruit weight may load the trailer conveyor 168, demanding a relatively large conveyor power. To relieve that otherwise large load on the trailer conveyor 168, a pair of baffles 232 are illustratively installed inside the container 182 in front of the trailer conveyor and rising from the bottom 192 up to a horizontal strut 234 crossing the width of the container 182. The vertical baffles 232 are illustratively V-shaped, with the bottom of the V facing the front, to allow fruit to pass from either side therefrom and thereby reach the trailer conveyor 168.

Alternatively, as will be readily appreciated by one skilled in the art, the vertical baffles may be curved or otherwise shaped so long as fruit is able to reach the trailer conveyor 168. The horizontal strut 234, which is anchored between both side walls 188, 190, is merely a strengthening element supporting the vertical baffles 232. In the tilted loading configuration, the vertical baffles 232 carry a large portion of the load of the fruit, and allow some of the fruit to pass aside those vertical baffles and to cover the surface of the conveyor belt 168 with a diminished weight of fruit.

It becomes now possible to operate the conveyor 168 with much reduced power requirements since only the fruit behind the vertical baffles 232 reaches the conveyor belt to load the trailer conveyor 168. Experience has shown, however, that for at least certain fruit, the baffles 232 may not be necessary. The explanation may reside in the shape and consistency of the fruit involved in the loading of the trailer conveyor 168. Although a large normal loading force is exerted on the conveyor 168, the fruit features perhaps a coefficient of rolling, in contrast with a coefficient of friction. It is probable that a difference of at least one order of magnitude being a multiplicand of the normal load coefficient explains why the baffles 232 may be deleted.

The elongated spout 178 is added to ensure a better distribution of the fruit being loaded in the flatbed removal truck 174. The spout 178 is pivotally connected adjacent the top of the trailer conveyor 168, for erection and folding by a mechanical, electrical, hydraulic, or other powering source readily known to those skilled in the art.

For loading fruit then, the fruit container 182 is first tilted before a flatbed truck 174 approaches and maneuvers under the spout 178, which spreads the fruit about evenly in the flatbed. However, if so desired, the spout 178 may be omitted, for the removal vehicle 174 may be loaded directly from the trailer conveyor 168 without the use of the spout. Deletion of the spout 178 saves the need for erecting the spout before the removal vehicle 174 approaches, and folding it after the removal vehicle departs and before the fruit collection trailer 154 is redressed.

It is understood that the control of the various configurations and operation of the fruit trailer 154 are well known to those skilled in the art and, therefore, need not be described in more detail here.

It will be appreciated by persons skilled in the art, that the translation and the tilting mechanisms may be implemented in various ways known to the art, which may include the use of a single power jack to both translate and tilt the fruit trailer. Additional features and advantages are described in copending applications filed concurrently herewith, assigned to the assignee of the present invention, entitled "FRUIT TRAILER FOR FRUIT HARVESTING SYSTEM AND ASSOCIATED METHODS", and having U.S. application Ser. No. 10/317,834. The entire disclosure of this application is incorporated hereby by reference. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A fruit collection apparatus for collecting fruit as the fruit is harvested from a tree, the fruit collection apparatus comprising:
   a vehicle; and
   a fruit collector carried by said vehicle and comprising
      a collection conveyor having opposing first and second ends and an exterior conveyor surface extending therebetween for collecting fruit as the fruit is harvested from the tree and advancing the fruit toward the second end of said collection conveyor, and
      a lifting conveyor downstream from said collection conveyor and having lower and upper end, an exterior surface and an interior conveyor surface extending between the lower and upper ends for picking up fruit and lifting the fruit toward the upper end of said lifting conveyor.

2. A fruit collection apparatus according to claim 1 wherein the exterior conveyor surface of said collection conveyor is inclined so that the first end defines a lower end and the second end defines an upper end.

3. A fruit collection apparatus according to claim 1 wherein said fruit collector further comprises an intermediate conveyor having opposing first and second ends and an exterior conveyor surface extending therebetween for receiving fruit from the second end of said collection conveyor and advancing fruit to the lower end of said lifting conveyor.

4. A fruit collection apparatus according to claim 3 wherein said collection conveyor extends outwardly adjacent a side of said vehicle; and wherein said intermediate conveyor extends in a horizontal direction parallel to the side of said vehicle and between the side of said vehicle and said collection conveyor.

5. A fruit collection apparatus according to claim 3 wherein the lower end of said lifting conveyor surrounds the second end of said intermediate conveyor; and wherein said fruit collector further comprises at least one trash removal brush for directing fruit from the second end of said intermediate conveyor downward onto the lower end of said lifting conveyor while directing trash outwardly therefrom.

6. A fruit collection apparatus according to claim 5 wherein said at least one trash removal brush comprises a pair of rotating trash removal brushes.

7. A fruit collection apparatus according to claim 1 wherein said fruit collector further comprises:
   a discharge chute within the upper end of said lifting conveyor; and
   at least one guide roll adjacent the upper end of said lifting conveyor for directing fruit from the interior conveyor surface into said discharge chute.

8. A fruit collection apparatus according to claim 1 wherein said lifting conveyor is positioned adjacent an end of said vehicle.

9. A fruit collection apparatus according to claim 1 further comprising a fruit container movable with said vehicle for containing fruit from said fruit collector.

10. A fruit collection apparatus according to claim 1 wherein said collection and lifting conveyors each comprises a respective hydraulically driven conveyor; and wherein said vehicle comprises a hydraulic power unit connected to drive said hydraulically driven conveyors.

11. A fruit collection apparatus according to claim 1 wherein said vehicle comprises:
a chassis;
an engine carried by said chassis; and
a pair of opposing tracks carried by said chassis and driven by said engine.

12. A fruit collection apparatus for collecting fruit as the fruit is harvested from a tree, the fruit collection apparatus comprising:
a vehicle; and
a fruit collector carried by said vehicle and comprising
a collection conveyor having opposing first and second ends and an inclined exterior conveyor surface extending therebetween for collecting fruit as the fruit is harvested from the tree and advancing the fruit upward to the second end of said first conveyor,
an intermediate conveyor having opposing first and second ends and an exterior conveyor surface extending therebetween for receiving fruit from the second end of said collection conveyor and advancing fruit to the second end of said intermediate conveyor,
a lifting conveyor having lower and upper ends and an interior conveyor surface extending therebetween for picking up fruit from the second end of said intermediate conveyor and lifting the fruit upward to the upper end of said lifting conveyor, the lower end of said lifting conveyor surrounding the second end of said intermediate conveyor, and
at least one trash removal brush for directing fruit downward onto the lower end of said lifting conveyor while directing trash outwardly therefrom.

13. A fruit collection apparatus according to claim 12 wherein said at least one trash removal brush comprises a pair of rotating trash removal brushes.

14. A fruit collection apparatus according to claim 12 wherein said collection conveyor extends outwardly adjacent a side of said vehicle.

15. A fruit collection apparatus according to claim 14 wherein said intermediate conveyor extends in a horizontal direction parallel to the side of said vehicle and between the side of said vehicle and said collection conveyor.

16. A fruit collection apparatus according to claim 12 wherein said fruit collector further comprises:
a discharge chute within the upper end of said lifting conveyor; and
at least one guide roll adjacent the upper end of said lifting conveyor for directing fruit from the interior conveyor surface into said discharge chute.

17. A fruit collection apparatus according to claim 12 wherein said lifting conveyor is positioned adjacent an end of said vehicle.

18. A fruit collection apparatus according to claim 12 further comprising a fruit container movable with said vehicle for containing fruit from said fruit collector.

19. A fruit collection apparatus according to claim 12 wherein said collection, intermediate and lifting conveyors each comprises a respective hydraulically driven conveyor; and wherein said vehicle comprises a hydraulic power unit connected to drive said hydraulically driven conveyors.

20. A fruit collection apparatus according to claim 12 wherein said vehicle comprises:
a chassis:
an engine carried by said chassis; and
a pair of opposing tracks carried by said chassis and driven by said engine.

21. A method for collecting fruit as the fruit is harvested from a tree, the method comprising:
positioning a fruit collector carried by a vehicle adjacent a fruit tree to be harvested, the fruit collector comprising a collection conveyor having opposing first and second ends and an exterior conveyor surface extending therebetween, and a lifting conveyor downstream from the collection conveyor and having lower and upper ends, an exterior surface and an interior conveyor surface extending between the lower and upper ends;
operating the collection conveyor for collecting fruit as the fruit is harvested from the tree and advancing the fruit toward the second end of the collection conveyor; and
operating the lifting conveyor for picking up fruit and lifting the fruit upward toward the upper end of the lifting conveyor.

22. A method according to claim 21 wherein the exterior conveyor surface of the collection conveyor is inclined so that the first end defines a lower end and the second end defines an upper end.

23. A method according to claim 21 wherein the fruit collector further comprises an intermediate conveyor having opposing first and second ends and an exterior conveyor surface extending therebetween; and further comprising receiving fruit from the second end of the collection conveyor onto the intermediate conveyor and advancing fruit to the lower end of the lifting conveyor.

24. A method according to claim 23 wherein the lower end of the lifting conveyor surrounds the second end of the intermediate conveyor; and further comprising providing at least one trash removal brush adjacent the lower end of the third conveyer for directing fruit from the second end of the intermediate conveyor and downward onto the lower end of the lifting conveyor while directing trash outwardly therefrom.

25. A method according to claim 21 further comprising discharging fruit from the upper end of the lifting conveyor into a fruit container movable with the vehicle.

26. A method according to claim 21 wherein discharging comprises:
providing a discharge chute within the upper end of the third conveyor; and
using at least one guide roll adjacent the upper end of the third conveyor for directing fruit from the interior conveyor surface into the discharge chute.

27. A method according to claim 21 wherein the collection and lifting conveyors each comprises a respective hydraulically driven conveyor; and wherein the vehicle comprises a hydraulic power unit; and further comprising hydraulically driving the conveyors via the vehicle hydraulic power unit.

28. A method according to claim 21 wherein the vehicle comprises:
a chassis;
an engine carried by the chassis; and
a pair of opposing tracks carried by the chassis and driven by the engine.

* * * * *